United States Patent [19]

Everett et al.

[11] Patent Number: 5,407,977

[45] Date of Patent: * Apr. 18, 1995

[54] SOLVENT SYSTEM

[75] Inventors: John P. Everett, Bühl-Waldmatt, Germany; Jan J. Zwinselman, Siebnen, Switzerland

[73] Assignee: The Dow Chemical Company, Midland, Mich.

[*] Notice: The portion of the term of this patent subsequent to Aug. 30, 2011 has been disclaimed.

[21] Appl. No.: 129,888

[22] Filed: Sep. 30, 1993

Related U.S. Application Data

[63] Continuation-in-part of Ser. No. 50,696, Apr. 20, 1993, Pat. No. 5,342,869.

[51] Int. Cl.$^6$ .................... C08K 5/3415; C08L 63/02
[52] U.S. Cl. ................................ 523/429; 523/428; 524/389
[58] Field of Search ................ 523/428, 429; 524/389

[56] References Cited

U.S. PATENT DOCUMENTS

| | | |
|---|---|---|
| 3,679,465 | 7/1972 | Flynn et al. . |
| 4,153,516 | 5/1979 | Reed et al. . |
| 4,413,015 | 11/1983 | Anderson et al. ................ 426/131 |

FOREIGN PATENT DOCUMENTS

| | | |
|---|---|---|
| 677466 | 4/1966 | Belgium . |
| 0078615 | 5/1983 | European Pat. Off. . |
| 0196077 | 10/1986 | European Pat. Off. . |
| 0458502 | 11/1991 | European Pat. Off. . |
| 0472830 | 3/1992 | European Pat. Off. . |
| 2314169 | 1/1977 | France . |
| 133955 | 1/1979 | German Dem. Rep. . |
| 134446 | 2/1979 | German Dem. Rep. . |
| 2545149 | 4/1977 | Germany . |
| 2650408 | 5/1978 | Germany . |
| 1-226847 | 9/1989 | Japan . |
| 2-279776 | 11/1990 | Japan . |
| 257115 | 3/1949 | Switzerland . |

OTHER PUBLICATIONS

Lee & Neville, Handbook of Epoxy Resins, 1967, pp. 10–16.

Th. J. Burkey et al., "Equilibrium studies of water and thiol addition to ketones: substituent and solvent effects for methyl ketones", Journal of the American Chemical Society, vol. 105, No. 4, 23 Feb. 1983, pp. 868–871.

*Primary Examiner*—Melvyn I. Marquis
*Assistant Examiner*—D. Aylward

[57] ABSTRACT

An essentially water-free solvent system comprising methoxy acetone and an organic protic solvent is useful as a solvent for a) a curing agent for an epoxy resin and/or
b) a curing catalyst and/or
c) a cure inhibitor.

19 Claims, No Drawings

SOLVENT SYSTEM

CROSS-REFERENCE TO RELATED APPLICATION

This application is a Continuation-in-Part of the application Ser. No. 08/050,696 filed Apr. 20, 1993, U.S. Pat. No. 5,342,869.

BACKGROUND OF THE INVENTION

The present invention relates to a solvent system and to the use of the solvent system for dissolving one or more curing agents for epoxy resins and/or one or more curing catalysts and/or one or more cure inhibitors.

It is a well known technique to utilize an organic solvent for reducing the viscosity of liquid epoxy resins or liquid curing agents therefore or to solubilize solid resins and/or curing agents in organic solvents in order to facilitate the handling of the epoxy resins and/or of the curing agents.

U.S. Pat. No. 3,679,465 teaches the production of reinforced, hardenable epoxy compositions by continuously passing a reinforcement material through an epoxy solution system, thereby impregnating the reinforcement material with the epoxy solution system. The impregnated reinforcement material is subjected to a heat treatment. The epoxy solution system contains a curable epoxy resin, a curing agent therefore and a low boiling solvent. Various types of conventional curing agents or hardeners as well as accelerators are listed, such as primary and secondary amines, amides, polyamines, polyamides, dicyandiamide, benzoguanamine, imidazole, tetramethyl diamine, etc. As useful low boiling organic solvents are mentioned acetone or methyl ethyl ketone, or a mixture of dimethyl formamide, acetone and water.

It is known that mixtures containing an epoxy resin and certain curing agents therefore, such as dicyandiamide, have excellent storage stability at 20° C. Therefore, these mixtures are useful for producing so-called "one-component systems" which cure upon heating.

East German patent 134 446 teaches that a major disadvantage of known one-component systems is the low solubility of dicyandiamide in the solvents which are used in these systems. The amount of dicyandiamide required for curing the system is often close to or even above its saturation concentration in the solvent. Precipitation of dicyandiamide from the one-component system at low temperature, such as 0° C., is quite frequent. In order to overcome this disadvantage, the East German patent suggests the production of a one-component system by dissolving an epoxy resin and dicyandiamide in a mixture consisting of a glycol ether and water. Water is used in an amount of from 1 to 30 percent, preferably 5 to 15 percent, by the weight of the glycol ether. Useful glycol ethers are said to be ethyl glycol and/or methyl glycol.

WORLD PATENT INDEX, Abstract No. 79-26180B by Derwent Publications Ltd., which abstracts East German patent 133 955, discloses that a hardener for epoxy resins consists of dicyandiamide dissolved in a solvent mixture of glycol ethers, especially ethyl glycol and/or methyl glycol, containing 1 to 50, preferably 5 to 20 wt. -percent, water. It is disclosed that the presence of water doubles the dicyandiamide solubility. Presently, the monomethyl ether and monoethyl ether of ethylene glycol as well as dimethyl formamide are widely used in the industry for dissolving epoxy hardeners like dicyandiamide.

However, the wide use of ethylene glycol monomethyl ether, ethylene glycol monoethyl ether and dimethyl formamide has raised some concern among environmentalists.

It is known from Swiss patent 257,115 to heat an epoxy resin in the presence of a solvent with dicyandiamide and an aldehyde condensation product containing etherified methylol groups, such as alkyl ethers of methylolmelamine or of methylolureas. It is suggested to dissolve the epoxy resin in an organic solvent, such as 2-methyl-pentanediol-(2,4), toluene, cyclohexanol, etc. and to add the other components. Alternatively, the epoxy resin can be combined with a mixture of dicyandiamide, aldehyde condensation product and solvent. From 2 to 20 percent, preferably from 6 to 10 percent, of dicyandiamide is used for curing, based on the weight of the epoxy resin. The Swiss patent teaches that the amount of the aldehyde condensation product must be high enough to enable a complete absorption of dicyandiamide in the resin solution. Lacquer resin solutions are produced which can be used for applying coats of lacquer on metals. These coats of lacquer have good properties, such as good adherence to metals and high resistance to chemicals.

WORLD PATENT INDEX LATEST, Abstract No. 91-003223 by Derwent Publications Limited, abstracting published Japanese patent application JP-A-2,279,776 discloses an ink composite containing an epoxy resin, a hardening agent and a solvent. Dicyandiamide, imidazole compounds, triazine compounds, urea compounds, aromatic amine compounds and one or more kinds of photo-cationic polymerization catalysts are used as a hardening agent. The compound of formula $R^1$—$(OR^2)_nOR^3$ and one or more kinds of solvent naphtha are used as a solvent. $R^1$ is hydrogen or $C_{1-8}$-alkyl, $R^2$ is methylene or ethylene, $R^3$ is hydrogen or —C(O)—$R^4$ wherein $R^4$ is $C_{1-8}$-alkyl and n is 1 to 4.

Published German patent applications DE-A-2,545,149 and DE-A-2,650,408 suggest the use of a mixture of diacetone alcohol and water for dissolving dicyandiamide. It is recommended to dissolve 3 weight parts of dicyandiamide in 65 weight parts of diacetone alcohol and 13.3 weight parts of water. However, trials made by the Applicants have shown that dicyandiamide dissolves very slowly in the suggested mixture of diacetone alcohol and water. Apparently no more than 3 weight parts of dicyandiamide can be dissolved in the suggested solvent mixture. Furthermore, upon addition of an epoxy resin solution described in detail in the Examples further below, the dicyandiamide solution in diacetone alcohol and water turns turbid. The turbidity is an indication that dicyandiamide crystallizes.

The published Belgian patent application BE-A-677,466 discloses an epoxy resin and 1-cyanoguanidine dissolved in a solvent mixture of a low boiling point. The solvents in the solvent mixture are mainly polar. One solvent mainly serves to dissolve the epoxy resin. Acetone and/or ethyl acetate are suggested. The other solvent mainly serves to dissolve 1-cyanoguanidine. Water or a mixture of water and acetone or a low boiling alcohol, such as methanol and/or ethanol are suggested. However, trials made by the applicants have shown that the solubility of the expoxy resin and 1-cyanoguanidine in several of the suggested solvents, such as water, methanol, ethanol or acetone, is undesirably low.

Accordingly, one object of the present inventions is to find a new solvent system. Another object of the present invention is to find a solvent system which is useful for dissolving a curing agent for an epoxy resin, for dissolving a curing catalyst or a cure inhibitor for dissolving a blend thereof.

Applicants have found that an essentially water-free mixture comprising methoxy acetone and an organic protic solvent is a very useful solvent for a curing agent, such as a dicyandiamide, or for a curing catalyst, such as an imidazole, or for a cure inhibitor, such as boric acid, or for a mixture of two or more of such compounds.

Accordingly, one aspect of the present invention is an essentially water-free solvent system comprising methoxy acetone and an organic protic solvent.

Another aspect of the present invention is a method of preparing a solution of one or more compounds selected from the group consisting of
a) curing agents for an epoxy resin,
b) curing catalysts, and
c) cure inhibitors, in the indicated solvent system by contacting one or more such compounds with a solvent system comprising methoxy acetone and an organic protic solvent.

Yet another aspect of the present invention is a solution containing the indicated solvent system and one or more such compounds.

Yet another aspect of the present invention is an epoxy resin composition containing the indicated solution of the present invention and an epoxy resin.

The essentially water-free solvent system comprises methoxy acetone and one or more organic protic solvents. By the term "essentially water-free" is meant that the solvent system does not contain an essential amount of water. This means that the water content of the solvent system is not more than about 1 percent, preferably not more than about 0.1 percent, more preferably not more than about 0.01 percent, by the total weight of the solvent system. Most preferably, the solvent system does not contain any extractable amount of water.

The weight percentage of methoxy acetone in the solvent system of the present invention preferably is from about 25 to about 95 percent, more preferably from about 30 to about 65 percent, most preferably from about 40 to about 60 percent, by the total weight of the solvent system. Methoxy acetone, also named 1-methoxy-2-propanone, has the chemical formula $H_3C—C(O)—CH_2—OCH_3$. Methoxy acetone has a boiling point of about 114° C. at atmospheric pressure. The boiling point of the solvent system depends on the amount and kind of the organic protic solvent and of any optional compounds present. Generally, the solvent system has a boiling point of from 100° to 150° C., preferably from 105 to 140° C. This is very favorable because on one side the boiling point is low enough to allow removal of the boiling system after usage without substantial difficulties and on the other hand the boiling point is high enough that premature evaporation of the solvent system and a resulting quality loss generally is not experienced.

Methoxy acetone is a known compound. The author of JP-A-2,279,776 believes that methoxy acetone forms its peroxide under mild conditions. It is suggested to use peroxide-containing methoxy acetone as a radical polymerization initiator. The peroxide-containing methoxy acetone is said to have high dissolving power. Equilibrium constants for addition of water and 3-mercaptopropionic acid to various methyl ketones including methoxy acetone in $D_2O$ have been made by Th. J. Burkey et al., "Equilibrium studies of water and thiol addition to ketones: substituent and solvent effects for methyl ketones"; Journal of the American Chemical Society, vol. 105, no. 4, 23 Feb. 1983, pages 868–871. The potential biological importance of thiol addition to ketones is discussed in the article.

Preferably, the solvent system comprises from about 5 to about 75 percent, preferably from about 10 to about 70 percent, most preferably from about 10 to about 60 percent of one or more organic protic solvents, based on the total weight of the solvent system. If the solvent system comprises a blend of two or more organic protic solvents, the indicated percentages refer to their total weight. As will be described further below, the solvent system of the present invention may comprise other components in addition to methoxy acetone an an organic protic solvent. Generally, the solubility of an epoxy curing agent, such as dicyandiamide, or of a curing catalyst, such as an imidazole, in the solvent system increases when the content of the organic protic solvent in the solvent system increases. However, if the content of the organic protic solvent in the solvent system is too high, the compound dissolved in the solvent system tends to precipitate if the solution of the compound is mixed with an epoxy resin.

Useful saturated, aliphatic unsaturated or aromatic organic protic solvents generally contain one or more hydroxyl, mercapto, or acid groups, such as carboxyl. Preferably, the organic protic solvent contains one or two, more preferably only one, hydroxyl, mercapto or acid group. The protic organic solvent should be inert, i.e. at the chosen conditions for dissolving a curing agent, curing catalyst and/or cure inhibitor in the solvent system, it should neither undergo a chemical reaction with such compounds to an essential degree nor should it react with an epoxy resin which is chosen for preparing an epoxy resin composition. Based on the present teaching the skilled artisan knows how to select an organic protic solvent that does not react with the chosen curing agent, curing catalyst, cure inhibitor and/or epoxy resin.

Preferred organic protic solvents are monofunctional alcohols, such as saturated open-chain or cyclic alcohols, preferably methanol, ethanol, the propanols, such as n-propanol or isopropanol, the butanols, such as n-butanol or isobutanol, the hexanols, such as n-hexanol or cyclohexanol, the heptanols, octanols, decanols, dodecanols, such as lauryl alcohol, or the octadecanols, such as stearyl alcohol; or unsaturated alcohols, preferably the allyl or furfuryl alcohol. The alcohols preferably have 1 to 12, more preferably 1 to 8, most preferably 1 to 4 carbon atoms. Other useful alcohols are glycols or glycol monoethers. Preferred glycols are ethylene, propylene or butylene glycols, such as ethylene glycol, diethylene glycol, propylene glycol, dipropylene glycol, butylene glycol or dibutylene glycol.

Preferred glycol monoethers are the propylene or butylene glycol monoethers, most preferably ethers represented by formula I $$R_1O—(CH_2—CHR^3O)_n—R_2 \qquad (I)$$

wherein
one of the substituents $R_1$ and $R_2$ is an alkyl group having from 1 to 12, preferably from 1 to 6, more preferably from 1 to 4 carbon atoms and the other of the substituents $R_1$ and $R_2$ is hydrogen, R³ in each occurrence independently is methyl or ethyl and n is from 1 to 4, preferably 1, 2 or 3.

The alkyl groups may be branched or unbranched. Exemplary of the alkyl groups are methyl, ethyl, n-propyl, isopropyl, the butyl groups, such as n-butyl or isobutyl, and the pentyl, hexyl, octyl, decyl or dodecyl groups. Of the propyl and butyl groups n-propyl and n-butyl are preferred. Preferably, one of the substituents $R_1$ and $R_2$ independently is methyl or n-butyl.

Preferred monoethers of formula I are propylene glycol methyl ether, propylene glycol n-butyl ether, dipropylene glycol methyl ether and dipropylene glycol n-butyl ether.

Corresponding thiols containing one or more mercapto groups instead of one or more hydroxyl groups in the above-mentioned organic protic solvents are useful as well, such as 1,3-propane dithiol, ethane thiol or propane thiol.

Preferred acid groups are sulfenic, sulfinic or sulfonic acid groups, phosphinic or phosphonic acid groups or the carboxyl group. Carboxylic acids, such as formic acid, acetic acid, propionic acid, butanoic acid or pentanoic acid are preferred.

The preferred organic protic solvent are methanol, ethylene glycol and, most preferably, ethanol.

The solvent system of the present invention may comprise one or more organic protic solvents.

The solvent system may additionally comprise one or more aprotic oxygen-containing solvents other than methoxy acetone. Preferably, methoxy acetone, the organic protic solvent(s) and, if present, the aprotic oxygen-containing solvent other than methoxy acetone together amount to about 90 percent or more, more preferably to about 95 percent or more, most preferably to about 99 percent or more, of the total weight of the solvent system. Most preferably, the solvent system consists essentially of methoxy acetone, the organic protic solvent(s) and, optionally, the aprotic oxygen-containing solvent(s) other than methoxy acetone. In this case the above indicated ranges of the content of the organic protic solvent are based on the total weight of methoxy acetone, the organic protic solvent(s) and aprotic oxygen-containing solvent(s) other than methoxy acetone, if present.

Preferably, the weight ratio between the aprotic oxygen-containing solvent (other than methoxy acetone), if present, and methoxy acetone is from about 0.1:1 to about 2:1, more preferably from about 0.3:1 to about 1.5:1, most preferably from about 0.5:1 to about 1:1. Preferably, the weight ratio between the aprotic oxygen-containing solvent, if present, and the protic organic solvent is from about 0.01:1 to about 30:1, more preferably from about 1:1 to about 20:1, most preferably from about 2:1 to about 6:1. If the solvent system of the present invention does not comprise an aprotic oxygen-containing solvent (other than methoxy acetone) it preferably comprises from about 25 to about 95 percent, more preferably from about 30 to about 65 percent and most preferably from about 40 to about 60 percent of methoxy acetone and preferably from about 5 to about 75 percent, more preferably from about 35 to about 70 percent and most preferably from about 40 to about 60 percent of an organic protic solvent. If the solvent system comprises an aprotic oxygen-containing solvent in addition to methoxy acetone, it preferably comprises from about 25 to about 80 percent, more preferably from about 30 to about 65 percent and most preferably from about 40 to about 60 percent of methoxy acetone, preferably from about 5 to about 60 percent, more preferably from about 10 to about 45 percent, most preferably from about 10 to about 20 percent of an organic protic solvent and preferably from about 15 to about 70 percent, more preferably from about 25 to about 60 percent and most preferably from about 30 to about 50 percent of an aprotic oxygen-containing solvent (other than methoxy acetone).

Useful aprotic oxygen-containing solvents generally contain one or more ether or carbonyl functionalities. Aldehydes and ketones are preferred, such as formaldehyde, acetaldehyde, acetone, methyl ethyl ketone, methyl iso-butyl ketone or cyclohexanone.

Other useful aprotic oxygen-containing solvents are ethers, preferably propylene or butylene glycol diethers, most preferably ethers represented by formula II $$R_4O-(CH_2-CHR^3O)_n-R_5 \qquad (II)$$

wherein the substituents $R_4$ and $R_5$ each independently are an alkyl group having from 1 to 12, preferably from 1 to 6, more preferably from 1 to 4 carbon atoms, R³ in each occurrence independently is methyl or ethyl and n is from 1 to 4, preferably 1, 2 or 3.

Preferred alkyl groups are listed above with reference to formula I. Preferred diethers of formula II are propylene glycol dimethyl ether, propylene glycol methyl n-butyl ether, dipropylene glycol dimethyl ether and dipropylene glycol methyl n-butyl ether.

The solvent system may comprise other additives, such as viscosity modifiers, for example N-methyl pyrrolidone, thickeners, for example high molecular polyalkylene glycols, or plasticizers, for example dioctyl phthalate or chlorinated paraffin. If present, their amount preferably is from about 0.1 to about 9 percent, more preferably from about 1 to about 4 percent, based on the total weight of the solvent system.

The solvent system of the present invention is very useful as a solvent for a) a curing agent for an epoxy resin; and/or b) a curing catalyst; and/or C) a cure inhibitor.

Curing agents for epoxy resins, commonly also called epoxy hardeners, are well known in the art. Useful classes of curing agents are for example amides, acid anhydrides, boron trifluoride complexes, dicyandiamide, substituted dicyandiamides, polyester resins, novolacs or phenolic hardeners, i.e. compounds containing more than one aromatic hydroxyl group. Another class of curing agents well known in the art comprises prereacted adducts of epoxy resins with amines or anhydrides or dicyandiamide or phenolic resins. Preferred phenolic hardeners are described on pages 6-8 of European patent specification 0,240,565, the teaching of which is incorporated herein by reference. Other known curing agents are primary or secondary amines, hydrazides or hydrazine, preferably the multifunctional, more preferably the di- to hexafunctional primary amines, amides and hydrazides. Such curing agents are listed on column 5, lines 47-68 and column 6, lines 14-19 of U.S. Pat. No. 4,789,690, the teaching of which is incorporated herein by reference.

Further useful curing agents are listed on page 11, lines 41-58 and page 12, lines 1-40 of the published European patent application EP-A-0,458,502, the teaching of which is incorporated herein by reference. Other preferred curing agents are cyanamide, dicyanamide, derivatives of cyanamide or dicyanamide, dihydroxy phenols, biphenols, halogenated bisphenols, alkylated bisphenols, trisphenols, phenol-aldehyde resins, halogenated phenol-aldehyde novolac resins, alkylated phenol-aldehyde novolac resins, hydrocarbonphenol resins, hydrocarbon-halogenated phenol resins, hydrocarbon-alkylated phenol resins or a combination of two or more thereof.

The solvent system of the present invention is particularly useful for dissolving a dicyandiamide, such as a substituted dicyandiamide or non-substituted dicyandiamide (cyanoguanidine). The low solubility of dicyandiamide in other, known solvents or solvent compositions is well known. Therefore, there was a particular need for providing a solvent system in which dicyandiamide can be dissolved to a sufficient extent. It has been found that the solvent system of the present invention is a very good solvent for dicyandiamide. The solvent system of the present invention is also useful for dissolving substituted dicyandiamides, such as dicyandiamides wherein some, but not all, hydrogens bonded to a nitrogen are replaced by alkyl, preferably $C_{1-6}$-alkyl, more preferably methyl, ethyl or the propyl groups; or by aryl, preferably benzyl, more preferably 2-methylbenzyl. Preferably, the dicyandiamide carries only one of the above-listed substituents. Most preferably, the dicyandiamide is not substituted.

The solvent system of the present invention is useful for dissolving two or more of the above-mentioned curing agents for epoxy resins. The term "a curing agent" as used herein also comprises mixtures of two or more compounds which act as a curing agent for an epoxy resin.

If the solvent system is used for dissolving a curing agent, preferably from about 1 to about 20 percent, more preferably from about 2 to about 15 percent, most preferably from about 3 to about 12 percent of a curing agent is dissolved in the solvent system, by the weight of the solvent system. It is to be understood that the solubility of the curing agent in the solvent system of the present invention depends on various factors, such as the type of the curing agent, the specific composition of the solvent system and the amounts and types of compounds which may additionally be dissolved in the solvent system, such as a curing catalyst or a cure inhibitor. The solubility of a specific curing agent in a specific solvent system of the present invention can be evaluated by series trials.

Curing catalysts or curing accelerators which increase the speed of reaction between the curing agent and the epoxy resin are also well known in the art.

Curing catalysts or curing accelerators which increase the speed of reaction between the curing agent and the epoxy resin are also well known in the art. Preferred are tertiary amine-containing or heterocyclic amine containing compounds. Some curing catalysts may have an effect as a curing agent per se, such as benzoguanamidine, imidazoles, benzodimethylamine, metaphenolene diamine, or N,N,N',N'-tetramethyl-1,3-butadiamine. Preferred imidazoles are 2-methyl imidazole, 2-ethyl-4-methyl-imidazole or 2-phenylimidazole. 2-Methyl imidazole is the most preferred curing catalyst. Other curing catalysts which may be dissolved in the solvent system of the present invention are heterocyclic nitrogen compounds, phosphines, sulfides or ammonium, phosphonium or sulfonium containing compounds. Such curing catalysts are listed on page 12, lines 41-50, on pages 13-16 and on page 17, lines 1-22 of the published European patent application EP-A-0,458,502, the teaching of which is incorporated herein by reference. Exemplary of such curing catalysts are ethyltriphenyl phosphonium acetate, ethyltriphenyl phosphonium acetate.acetic acid complex, tetrabutyl phosphonium acetate, tetrabutyl phosphonium acetate.acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, tetramethylammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate.acetic acid complex,-N-methyl-N-methylenemethanaminium chloride, N-methyl-N-methylenemethanaminium iodide, N-methylpyridinium acetate, N-methylpyridinium acetate.acetic acid complex,N-methylpyridinium chloride, N-methylpyridinium iodide, 1-ethyl-2,3-dimethylimidazolium acetate, 1-ethyl-2,3-dimethylimidazolium acetate.acetic acid complex, 1-ethyl-2,3-dimethylimidazolium chloride, 1-ethyl-2,3-dimethylimidazolium iodide, N-methylquinolinium acetate, N-methylquinolinium acetate.acetic acid complex, N-methylquinolinium chloride, N-methylquinolinium iodide, N-methyl-1,3,5-triazinium acetate, N-methyl-1,3,5-triazinium acetate.acetic acid complex, N-methyl-1,3,5-triazinium chloride, N-methyl-1,3,5-triazinium iodide, ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine or an imidazole, an imidazolidine, an imidazoline, an oxazole, a pyrrole, a thiazole, a pyridine, a pyrazine, a morpholine, a pyridazine, a pyrimidine, a pyrrolidine, a pyrazole, a quinoxaline, a quinoazoline, a phthalozine, a quinoline, a purine, an indazole, an indole, an indolazine, a phenazine, a phenarazine, a phenothiazine, a pyrroline, an indoline, a piperidine, a piperazine; or a combination of two or more thereof.

The solvent system of the present invention is useful for dissolving two or more of the above-mentioned curing catalysts. The term "a curing catalyst" as used herein also comprises mixtures of two or more compounds which influence the speed of reaction between an epoxy resin and an epoxy hardener.

If the solvent system is used for dissolving a curing catalyst, generally from about 0.1 to about 40 percent, preferably from about 0.5 to about 35 percent, more preferably from about 1 to about 20 percent and most preferably from about 2 to about 12 percent of a curing catalyst is dissolved in the solvent system, by the weight of the solvent system. It is to be understood that the solubility of the curing catalyst in the solvent system of the present invention depends on various factors, such as the type of curing catalyst, the amount and type of curing agent which is optionally present in the solvent system, the specific composition of the solvent system and the amounts and types of compounds which may additionally be dissolved in the solvent system. The solubility of a specific curing catalyst in a specific solvent system of the present invention can be evaluated by series trials. In the case of imidazoles such as 2-methylimidazole, preferably from about 1 to about 20, more preferably from about 2 to about 12 percent of an imidazole is dissolved in the solvent system, by the weight of the solvent system.

Useful cure inhibitors are boric acid, metaboric acid, boric acid anhydride or maleic acid or a mixture of (meta)boric acid(anhydride) with at least one acid having a weak nucleophilic anion, such as fluoroboric acid ($HBF_4$). Cure inhibitors are described on page 17, lines 18–50 and page 18, lines 1–38 of the published European patent application EP-A-0,458,502, the teaching of which is incorporated by reference. If a cure inhibitor is dissolved in the solvent system, it is preferably dissolved in the solvent system in an amount of from about 0.1 to about 12 percent, more preferably from about 0.5 to about 6 percent, most preferably of from about 1 to about 4 percent, by the weight of the solvent system.

If the solvent system of the present invention contains substantial amounts of a curing agent, for example between about 3 and about 12 percent of dicyandiamide, the solubility of the curing catalyst and/or the cure inhibitor in the solvent system is generally smaller, usually between about 0.1 and about 3 percent, typically between about 0.5 and about 2 percent, based on the weight of the solvent system.

As indicated above, one aspect of the present invention is a method of preparing a solution of one or more compounds selected from the group consisting of a) curing agents for an epoxy resin, b) curing catalysts, and c) cure inhibitors by contacting one or more such compounds with an effective amount of a solvent system comprising methoxy acetone, an organic protic solvent and, optionally, an oxygen-containing solvent other than methoxy acetone. The solution may be prepared in a known way. Useful curing agents, curing catalyst and cure inhibitors as well as their useful concentrations in the solvent system are indicated above. Generally methoxy acetone, an organic protic solvent and, optionally, an oxygen-containing solvent other than methoxy acetone are mixed in the ratios indicated above at a temperature of from about 1 to about 80° C., preferably from about 15° to about 40° C., until a homogeneous mixture is obtained. Then the desired amount of curing catalyst and/or cure inhibitor for producing an epoxy resin composition. Such a resin composition is typically designated in the art as "one-component epoxy resin composition".

The epoxy resin composition of the present invention may comprise a wide variety of epoxy resins, provided that they are curable, preferably with dicyandiamide. Curable epoxy resins are well known in the art.

Suitable examples include epoxy resins from the reaction of polyphenols and epihalohydrins, polyalcohols and epihalohydrins, amines and epihalohydrins, sulfur-containing compounds and epihalohydrins, polycarboxylic acids and epihalohydrins, polyisocyanates and 2,3-epoxy-1-propanol (glycide) and from epoxidation of olefinically unsaturated compounds. Preferred epoxy resins are the reaction products of polyphenols and epihalohydrins, or polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins.

Illustrative examples of epoxy resins useful herein are described in The Handbook of Epoxy Resins by H. Lee and K. Neville, published in 1967 by McGraw-Hill, New York, in appendix 4-1, ppgs through 4–56 and U.S. Pat. Nos. 2,633,458; 3,477,990; 3,821,243; 3,970,719; 3,975,397; 4,071,477; and 4,582,892, and GB Patent Specification No. 1,597,610, all of which are incorporated herein by reference.

Epoxy resins of particular interest include diglycidyl ethers of bisphenol compounds, particularly those compounds represented by the following structure III: wherein each A is independently a divalent hydrocarbon group having from 1 to 8 carbon atoms, preferably methylene or, more preferably, isopropylidene ($-C(CH_3)_2-$), $-C(O)-$, $-O-$, $-S-$, $-S-S-$, $-S(O)-$, $-S(O)_2-$ or a covalent bond; each X is independently hydrogen, an alkyl group of 1 to 6 carbon atoms such as methyl, ethyl, propyl, butyl, pentyl or hexyl, or halogen, preferably chlorine or bromine; and n has an average

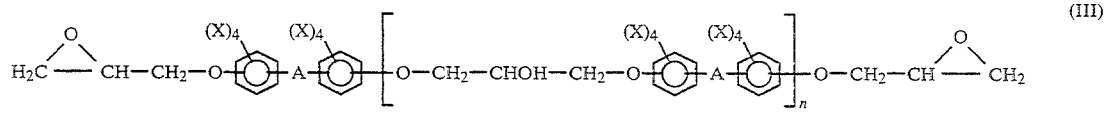

(III)

agent(s) and/or curing catalyst(s) and/or cure inhibitor(s) is added to the solvent system and the resulting mixture is stirred until a clear solution is obtained. The compounds to be dissolved can be added together or alternatingly to the solvent system of the present invention. Alternatively, each compound can be dissolved individually in the solvent system and the resulting solutions can be combined if desired. Preferred compositions of the resulting solutions of the present invention are described above.

The above described solutions of a curing agent and/or a curing catalyst and/or a cure inhibitor in the solvent composition of the present invention can be mixed with an epoxy resin for preparing an epoxy resin composition. Typically the epoxy resin is dissolved in a solvent. Although the solvent for the epoxy resin can be added simultaneously or after the epoxy resin has been mixed with the solution of the curing agent, curing catalyst and/or cure inhibitor, the epoxy resin is preferably pre-mixed with the solvent. The epoxy resin solution is then mixed with the solution of the curing agent, value of from 0 to 35, preferably from 0 to 10, most preferably from 0 to 2.

The average epoxy equivalent weight is advantageously from 149 to 3000, preferably from 170 to 950, most preferably from 170 to 450. The molecular weight is a weight average molecular weight.

Other polyhydric phenols which may be co-reacted with an epihalohydrin to provide these epoxy polyethers are such compounds as resorcinol, hydroquinone and substituted hydroquinones, e.g. methylhydroquinone.

Further useful liquid epoxy resins are those obtained from the reaction of polyhydric alcohols with epihalohydrins. These alcohols can be polyether polyols or polyester polyols.

Another useful class of polymeric resins includes liquid epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K., Handbook of Epoxy Resins, McGraw Hill Book Co. New York, 1967. The epoxy resin compositions of the present invention may contain two or more different epoxy resin.

Useful solvents for the epoxy resin are well known in the art. Preferred examples are 2-metyl-pentanediol-(2,4), toluene, o-dichlorobenzene, cyclohexanone, cyclohexanol or, more preferably, methyl ethyl ketone or methyl iso-butyl ketone. Mixtures of different solvents are also useful for dissolving the epoxy resin.

Generally, from about 50 to about 95 percent, preferably from about 60 to about 90 percent, more preferably from about 70 to about 85 percent epoxy resin is dissolved in a suitable solvent, based on the total weight of epoxy resin and solvent.

The epoxy resin composition of the present invention preferably comprises from about 0.5 to about 20 percent, more preferably from about 1 to about 10 percent, most preferably from about 2 to about 6 percent of a curing agent, such as dicyandiamide, based on the weight of the epoxy resin. The epoxy resin composition preferably also comprises from about 0.05 to about 2 percent, more preferably from about 0.08 to about 1 percent, most preferably from about 0.1 to about 0.5 percent of a curing catalyst, such as a 2-methylimidazole, based on the weight of the epoxy resin. The epoxy resin composition may comprise a cure inhibitor, such as boric acid, for modifying the curing catalyst. The amount of such a cure inhibitor, if present, preferably is from about 0.05 to about 2 percent, more preferably from about 0.08 to about 1 percent, most preferably from about 0.1 to about 0.5 percent, based on the weight of the epoxy resin. The epoxy resin composition optionally contains known auxiliary compounds, such as colorants, fillers and the like.

The weight ratio between the epoxy resin and methoxy acetone generally is from 0.5-20:1, preferably from 2-15:1, more preferably from 4-10:1. The weight ratio between the epoxy resin and the organic protic solvent generally is from 1-60:1, preferably from 5-40:1, more preferably from 10-30:1.

The epoxy resin compositions of the present invention are useful for various known applications, for example for preparing electrical laminates, coatings etc. At least the preferred embodiments of the epoxy resin composition of the present invention are homogeneous and generally have a viscosity that is low enough to allow a good impregnation of a reinforcing material, such as glass rovings, reinforcing mats etc. to produce reinforced epoxy compositions which cure upon heating. Techniques of impregnating reinforcing materials with epoxy resin compositions and curing the epoxy resin compositions are well known in the art.

The present invention is further illustrated by the following examples which should not be construed to limit the scope of the present invention. All parts and percentages are by weight unless otherwise mentioned.

Examples 1 to 36 and Comparative Examples A to G

The solubility of dicyandiamide in various solvents and solvent systems is tested at room temperature. The amounts of the component(s) of the solvent system and of dicyandiamide are listed in the following table as weight percentage, based on the total weight of the solvent system. The produced dicyandiamide solutions are evaluated after they have been freshly prepared and after storage at 0° C. during 24 hours. The results are listed in the following Table. "Y" and "N" mean that some (Y) or no (N) crystallization or precipitation in the dicyandiamide solution is observed.

Varying amounts of a dicyandiamide solution (from 30 to 40 parts) are blended with 100 parts of an epoxy resin solution. The epoxy resin solution contains 80 percent of a solid reaction product of a liquid epoxy resin and tetrabromobisphenol A and 20 percent of methyl ethyl ketone. The epoxy resin solution is commercially available as D.E.R. 535 EK 80 epoxy resin from The Dow Chemical Company. The produced epoxy resin compositions are evaluated after they have been freshly prepared and after storage at 0° C. during 24 hours. The results are listed in the following Table. "Y" and "N" mean that some (Y) or no (N) crystallization or precipitation in the epoxy resin composition is observed.

|  | (Comparative) Example | | | | | | | | | | |
| --- | --- | --- | --- | --- | --- | --- | --- | --- | --- | --- | --- |
|  | A | B | C | D | E | F | G | 1 | 2 | 3 | 4 |
| methoxy acetone | 100 |  |  |  |  |  |  | 44 | 44 | 44 | 44 |
| propylene glycol methyl ether |  | 100 |  |  |  |  |  | 44 | 44 | 44 | 44 |
| methanol |  |  | 100 |  |  |  |  | 12 | 12 |  |  |
| ethanol |  |  |  | 100 |  |  |  |  |  | 12 | 12 |
| ethylene glycol |  |  |  |  | 100 |  |  |  |  |  |  |
| methyl ethyl ketone |  |  |  |  |  | 100 |  |  |  |  |  |
| acetone |  |  |  |  |  |  | 100 |  |  |  |  |
| acetic acid (99%) |  |  |  |  |  |  |  |  |  |  |  |
| propionic acid |  |  |  |  |  |  |  |  |  |  |  |
| dicyandiamide | 1 | 1 | 5 | 1 | 15 | 2 | 1 | 7.0 | 8.0 | 7.0 | 8.0 |
| Cryst./prec. |  |  |  |  |  |  |  |  |  |  |  |
| fresh | N | Y | Y | Y | Y | Y | Y | N | N | N | N |
| after 24 hrs | N[1)] | Y | Y | Y | Y | Y | Y | N | N | N | N |
| epoxy resin | —[1)] | — | — | — | — | — | — | 100 | 100 | 100 | 100 |
| dicyandiamide solution | — | — | — | — | — | — | — | 34.4 | 30.0 | 34.4 | 30.0 |
| Cryst./prec. |  |  |  |  |  |  |  |  |  |  |  |
| fresh | — | — | — | — | — | — | — | N | N | N | Y |
| after 24 hrs | — | — | — | — | — | — | — | N | Y | N | Y |
| (Comparative) Example | | | | | | | | | | | |

-continued

| | 5 | 6 | 7 | 8 | 9 | 10 | 11 | 12 | 13 | 14 | 15 | 16 |
|---|---|---|---|---|---|---|---|---|---|---|---|---|
| methoxy acetone | 44 | 44 | 40 | 35 | 40 | 35 | 40 | 35 | 44 | 44 | 44 | 44 |
| propylene glycol methyl ether | 44 | 44 | 48 | 53 | 48 | 53 | 48 | 53 | | | | |
| methanol | | | 12 | 12 | | | | | | | | |
| ethanol | | | | | 12 | 12 | | | 12 | 12 | | |
| ethylene glycol | 12 | 12 | | | | | 12 | 12 | | | 12 | 12 |
| methyl ethyl ketone | | | | | | | | | 44 | | 44 | |
| acetone | | | | | | | | | | 44 | | 44 |
| acetic acid (99%) | | | | | | | | | | | | |
| propionic acid | | | | | | | | | | | | |
| dicyandiamide | 7.0 | 8.0 | 7.0 | 7.0 | 7.0 | 7.0 | 8.0 | 7.0 | 6.0 | 7.0 | 7.0 | 7.0 |
| Cryst./prec. | | | | | | | | | | | | |
| fresh | N | N | N | N | N | Y | N | N | N | N | N | N |
| after 24 hrs | N | N | N | Y | N | Y | N | N | Y | Y | N | N |
| epoxy resin | 100 | 100 | 100 | 100 | 100 | 100 | 100 | 100 | 100 | 100 | 100 | 100 |
| dicyandiamide solution | 34.4 | 30.0 | 34.4 | 34.4 | 34.4 | 34.4 | 30.0 | 30.0 | 40.0 | 34.4 | 34.4 | 34.4 |
| Cryst./prec. | | | | | | | | | | | | |
| fresh | N | N | N | N | N | Y | N | N | Y | Y | N | N |
| after 24 hrs | N | N | N | Y | N | Y | N | N | Y | Y | Y | N |

| | (Comparative) Example | | | | | | | | | | | |
|---|---|---|---|---|---|---|---|---|---|---|---|---|
| | 17 | 18 | 19 | 20 | 21 | 22 | 23 | 24 | 25 | 26 | 27 | 28 |
| methoxy acetone | 80 | 80 | 90 | 50 | 90 | 75 | 50 | 90 | 75 | 50 | 90 | 75 |
| propylene glycol methyl ether | | | | | | | | | | | | |
| methanol | | | 10 | 50 | 10 | 25 | 50 | 10 | 25 | 50 | | |
| ethanol | | | | | | | | | | | 10 | 25 |
| ethylene glycol | | | | | | | | | | | | |
| methyl ethyl ketone | | | | | | | | | | | | |
| acetone | | | | | | | | | | | | |
| acetic acid (99%) | 20 | | | | | | | | | | | |
| propionic acid | | 20 | | | | | | | | | | |
| dicyandiamide | 8.0 | 8.0 | 6.0 | 6.0 | 7.0 | 7.0 | 7.0 | 8.0 | 8.0 | 8.0 | 6.0 | 6.0 |
| Cryst./prec. | | | | | | | | | | | | |
| fresh | N | N | N | N | N | N | N | N | N | Y | N | N |
| after 24 hrs | N | N | N | Y | N | N | Y | N | N | Y | N | N |
| epoxy resin | 100 | 100 | 100 | 100 | 100 | 100 | 100 | 100 | 100 | 100 | 100 | 100 |
| dicyandiamide solution | 30.0 | 30.0 | 40.0 | 40.0 | 34.4 | 34.4 | 34.4 | 30.0 | 30.0 | 30.0 | 40.0 | 40.0 |
| Cryst./prec. | | | | | | | | | | | | |
| fresh | N | N | N | N | N | N | N | N | N | Y | N | N |
| after 24 hrs | N | N | N | N | N | N | Y | Y | Y | Y | N | N |

| | (Comparative) Example | | | | | | | | | |
|---|---|---|---|---|---|---|---|---|---|---|
| | 27 | 28 | 29 | 30 | 31 | 32 | 33 | 34 | 35 | 36 |
| methoxy acetone | 90 | 75 | 50 | 90 | 75 | 90 | 75 | 90 | 75 | 50 |
| propylene glycol methyl ether | | | | | | | | | | |
| methanol | | | | | | | | | | |
| ethanol | 10 | 25 | 50 | 10 | 25 | 10 | 25 | | | |
| ethylene glycol | | | | | | | | 10 | 25 | 50 |
| methyl ethyl ketone | | | | | | | | | | |
| acetone | | | | | | | | | | |
| acetic acid (99%) | | | | | | | | | | |
| propionic acid | | | | | | | | | | |
| dicyandiamide | 6.0 | 6.0 | 6.0 | 7.0 | 7.0 | 8.0 | 8.0 | 8.0 | 8.0 | 8.0 |
| Cryst./prec. | | | | | | | | | | |
| fresh | N | N | Y | N | N | N | N | N | N | N |
| after 24 hrs | N | N | Y | N | N | N | N | N | N | N |
| epoxy resin | 100 | 100 | 100 | 100 | 100 | 100 | 100 | 100 | 100 | 100 |
| dicyandiamide solution | 40.0 | 40.0 | 40.0 | 34.4 | 34.4 | 30.0 | 30.0 | 30.0 | 30.0 | 30.0 |
| Cryst./prec. | | | | | | | | | | |
| fresh | N | N | Y | N | N | N | N | N | N | N |
| after 24 hrs | N | N | Y | N | Y | Y | Y | N | N | N |

[1])not measured

Comparative Examples A–G illustrate that the solubility of dicyandiamide in undiluted methoxy acetone, propylene glycol monomethyl ether, methanol, ethanol, methyl ethyl ketone or acetone is very low. The solubility of dicyandiamide in methoxy acetone is 10% at 60° C., however, upon cooling to room temperature the dissolved dicyandiamide precipitates. The comparisons between Examples 7 and 8 and between 9 and 10 respectively illustrate that the most preferred concentration of methoxy acetone in the solvent system of the present invention is at least 40 percent. The comparisons between Examples 8, 10 and 12 and between 25, 33 and 50 respectively illustrates that the solubility of dicyandiamide in the solvent system of the present invention depends, among other factors, on the type of organic protic solvent.

What is claimed is:

1. A solution containing one or more compounds selected from the group consisting of
   a) curing agents for an epoxy resin,
   b) curing catalysts, and
   c) cure inhibitors and an essentially water-free solvent system comprising an organic protic solvent and from about 25 to 95 percent of methoxy acetone, based on the total weight of the solvent system.

2. The solution of claim 1 wherein the organic protic solvent contains one or more hydroxyl groups.

3. The solution of claim 1 wherein the organic protic solvent is a monofunctional alcohol, a glycol or a glycol monoether.

4. The solution of claim 1 comprising from about 30 to about 65 percent of methoxy acetone, based on the total weight of the solvent system.

5. The solution of claim 3 comprising from about 30 to about 65 percent of methoxy acetone, based on the total weight of the solvent system.

6. The solution of claim 1 wherein the solvent system additionally comprises an aprotic oxygen-containing organic solvent other than methoxy acetone.

7. The solution of claim 4 wherein the solvent system additionally comprises an aprotic oxygen-containing organic solvent other than methoxy acetone.

8. The solution of claim 5 wherein the solvent system additionally comprises an aprotic oxygen-containing organic solvent other than methoxy acetone.

9. The solution of claim 1 wherein the organic protic solvent, methoxy acetone, and, if present, the aprotic oxygen-containing solvent other than methoxy acetone together comprise about 90 percent or more by weight of the solvent system.

10. The solution of claim 8 wherein the organic protic solvent, methoxy acetone, and, if present, the aprotic oxygen-containing solvent other than methoxy acetone together comprise about 90 percent or more by weight of the solvent system.

11. The solution of claim 1 wherein the solvent system comprises from about 30 to about 65 percent of methoxy acetone and from about 35 to about 70 percent of an organic protic solvent, based on the total weight of the solvent system.

12. The solution of claim 1 wherein the solvent system comprises from about 25 to about 80 percent of methoxy acetone, from about 5 to about 60 percent of an organic protic solvent and from about 15 to about 70 percent of an aprotic oxygen-containing organic solvent other than methoxy acetone, based on the total weight of the solvent system.

13. A method of preparing a solution of one or more compounds selected from the group consisting of
    a) curing agents for an epoxy resin,
    b) curing catalysts, and
    c) cure inhibitors in a solvent system which comprises contacting one or more such compounds with an essentially water-free solvent system comprising an organic protic solvent and from about 25 to about 95 percent of methoxy acetone, based on the total weight of the solvent system.

14. The method of claim 13 wherein the solvent system additionally comprises an aprotic oxygen-containing organic solvent other than methoxy acetone.

15. The solution of claim 1 wherein the curing agent a) is a dicyandiamide.

16. The solution of claim 1 wherein the curing catalyst b) is an imidazole.

17. The solution of claim 1 wherein the cure inhibitor c) is boric acid.

18. An epoxy resin composition containing an epoxy resin, one or more compounds selected from the group consisting of
    a) curing agents for an epoxy resin,
    b) curing catalysts, and
    c) cure inhibitors and an essentially water-free solvent system comprising an organic protic solvent and from about 25 to about 95 percent of methoxy acetone, based on the total weight of the solvent system.

19. The epoxy resin composition of claim 18 wherein the epoxy resin is a diglycidyl ether of a bisphenol compound.

* * * * *